R. P. MONTAGUE.
Corn-Droppers.

No. 152,806.

Patented July 7, 1874.

WITNESSES:

INVENTOR:
R. P. Montague
BY
ATTORNEYS.

UNITED STATES PATENT OFFICE.

RICHARD PETER MONTAGUE, OF WHITLEY'S POINT, ILLINOIS.

IMPROVEMENT IN CORN-DROPPERS.

Specification forming part of Letters Patent No. 152,806, dated July 7, 1874; application filed April 18, 1874.

*To all whom it may concern:*

Figure 1:
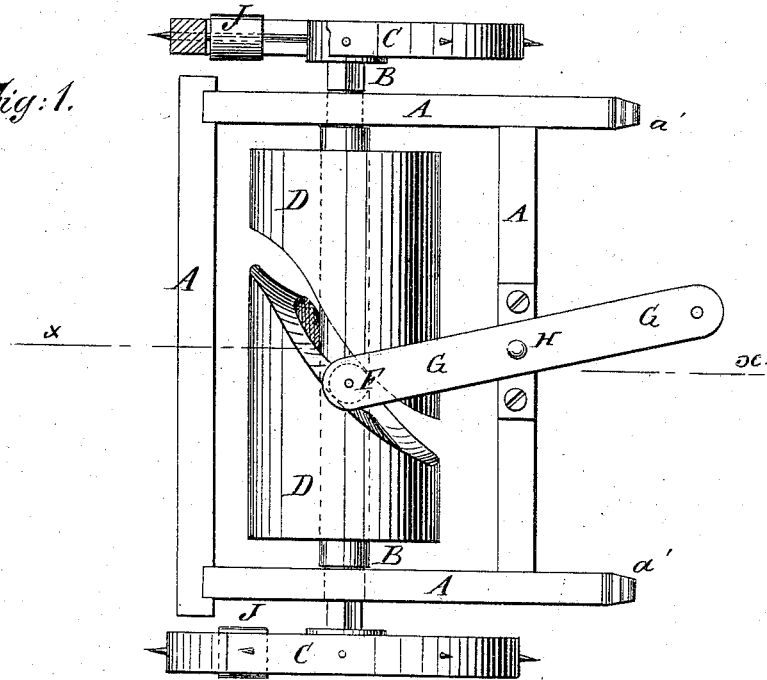
Figure 2:
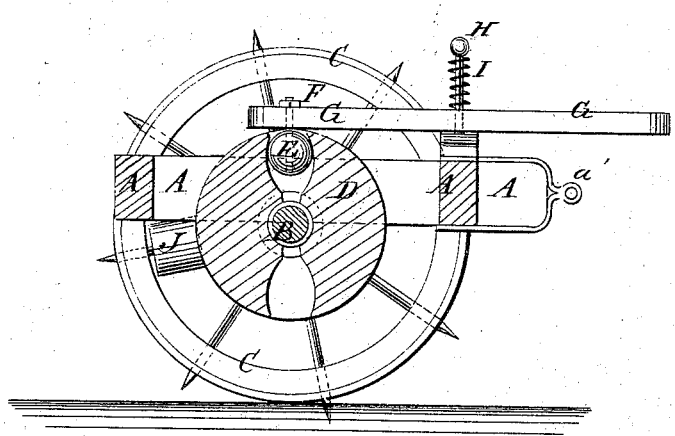

Be it known that I, RICHARD P. MONTAGUE, of Whitley's Point, in the county of Moultrie and State of Illinois, have invented a new and useful Improvement in Corn-Dropper, of which the following is a specification:

Figure 1 is a top view of my improved device, part being broken away to show the construction. Fig. 2 is a vertical section of the same, taken through the line $x$ $x$, Fig. 1.

Similar letters of reference indicate corresponding parts.

The invention will first be fully described, and then pointed out in the claim.

A represents the frame of the device, which consists of two side bars and two cross-bars framed to each other. The forward ends of the side bars of the frame A project, and to them are attached eye-straps $a'$ to receive hooks for connecting the device with the framework of the planter in such a way that it may adjust itself to the unevenness of the ground. B is the axle, which revolves in bearings attached to the side bars of the frame A, and to its ends are attached the hubs of the wheels C, so that the said wheels may carry the said axle with them in their revolution. The hubs of the wheels are cast-iron, and are cast upon the inner ends of the spokes, which spokes are made of wrought-iron, and their outer ends pass through and project an inch or more beyond the outer side of the wooden fellies, so as to prevent the wheels from slipping upon the ground. To the axle B is attached a cylinder, D, in which is formed a zigzag groove, the sides of which are concaved to receive the ball-pivot E, which revolves upon a bolt, F, attached to the end of the lever G, so that the said lever may be oscillated by the advance of the machine. The lever G oscillates upon a long bolt, H, attached to the center of the forward cross-bar of the frame A. Upon the bolt H, above the lever G, is placed a coiled spring, I, which holds the said lever down to its place, and the elasticity of which allows the lever G to move up and down upon the bolt H as the device changes its position in passing over uneven ground. The forward end of the lever G is pivoted to the dropping-slide of the planter. The lever G may be lengthened or shortened to adjust it to the throw of the dropping-slide.

To a spoke of each of the wheels C is attached a weight, J, in such a position that when the weights are directly beneath the centers of the wheels the lever G may be parallel with the length of the machine. The weights J thus serve as a guide to the operator in starting in at the side of the field, and enable him to adjust the machine without getting off the planter, since, by raising the machine off the ground, the weights J will bring the machine into proper position. The device may be raised from the ground by a lever, which is not shown in the drawing.

Having thus described my invention, I claim as new and desire to secure by Letters Patent—

In a corn-dropper the combination, with cam-wheel D, of the lever G, pivoted frame A, pin H, and spring I, as and for the purpose specified.

RICHARD PETER MONTAGUE.

Witnesses:
HEZEKIAH PLACE,
J. W. W. BROWN.